No. 768,907. PATENTED AUG. 30, 1904.
J. J. NUTT.
HAIR DRYING APPARATUS.
APPLICATION FILED NOV. 4, 1903.
NO MODEL.
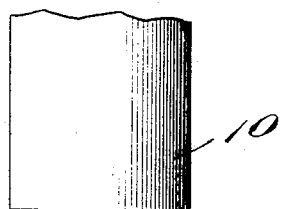
FIG. 1.
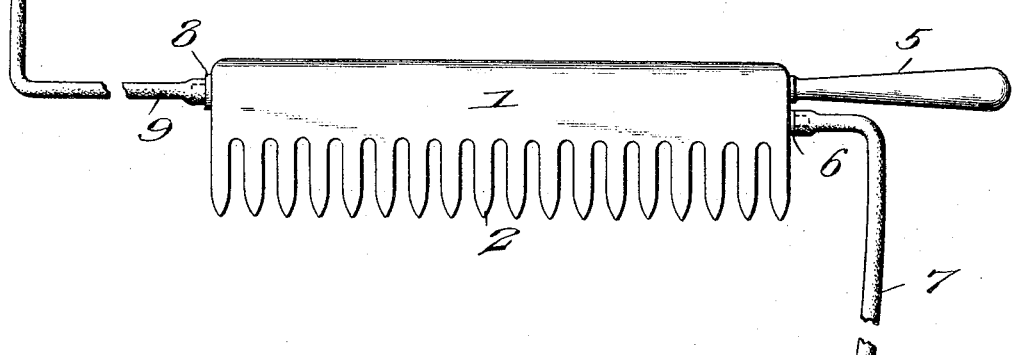
FIG. 3.
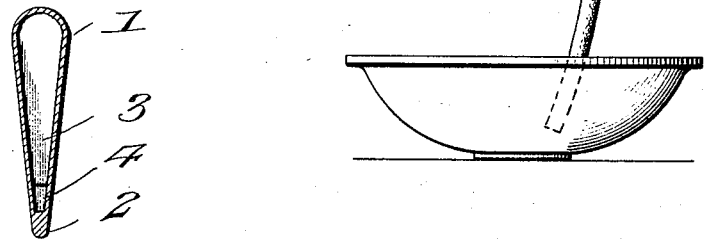
FIG. 2.
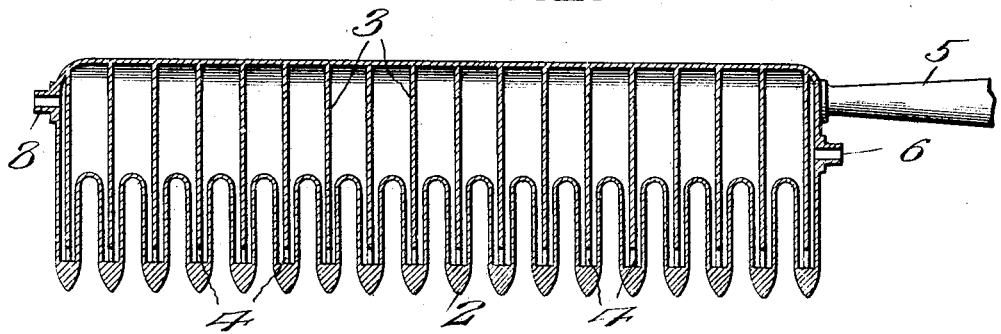
Witnesses
Harry L. Ames.
Hubert D. Lawson.
Inventor
John Joseph Nutt.
By Victor J. Evans
Attorney No. 768,907.

Patented August 30, 1904.

UNITED STATES PATENT OFFICE.

JOHN JOSEPH NUTT, OF NEW YORK, N. Y.

HAIR-DRYING APPARATUS.

SPECIFICATION forming part of Letters Patent No. 768,907, dated August 30, 1904.

Application filed November 4, 1903. Serial No. 179,810. (No model.)

*To all whom it may concern:*

Be it known that I, JOHN JOSEPH NUTT, a citizen of the United States, residing at New York, in the county of New York and State of New York, have invented new and useful Improvements in Hair-Drying Apparatus, of which the following is a specification.

My invention relates to new and useful improvements in hair-drying apparatus; and its object is to provide a simple, durable, and inexpensive device which may be readily applied to the hair and which can be moved backward and forward therein, so as to present heated surfaces to all parts of the hair.

A further object is to employ simple and inexpensive means for heating the device.

With the above and other objects in view the invention consists in providing a hollow comb-like device arranged to contain a heating medium.

My invention also contemplates a modified form of the device in which the teeth of the comb-like structure are provided with partitions so arranged as to cause a hot liquid which may be contained within the device to circulate through the teeth or projections, so as to sufficiently heat the exterior surfaces thereof.

The invention also consists in the novel construction and combination of parts hereinafter more fully described and claimed, and illustrated in the accompanying drawings, in which—

Figure 1 is a side elevation of the preferred form of the apparatus. Fig. 2 is a vertical longitudinal section through the body thereof, and Fig. 3 is a transverse section through one of the teeth.

Referring to the figures by numerals of reference, 1 is a casing the side faces of which are inclined toward one edge and having teeth 2 continuous therewith, said teeth being preferably provided with round ends. Secured within the casing are parallel partitions 3, which extend downward into the teeth and terminate at points slightly removed from the ends of the teeth, so as to form passages 4. The handle 5 extends from one end of the casing, and adjacent this handle is an outlet 6, to which a flexible tube 7 or other suitable device may be secured. An inlet 8 is arranged at the other end of the casing and may be connected, by means of a tube 9, with a tank 10 or other suitable hot-water supply. When the device is to be used, hot water is admitted to the casing 1 through the tube 9 and flows between the several partitions 3, said partitions serving to direct the water downward into the the teeth 2 and finally through the outlet 6 and the tube 7 into any suitable receptacle provided. During the passage of the water through the casing the teeth extending from said casing can be drawn through the hair, and the heated surface thereof will drive the moisture therefrom, thereby quickly drying the hair. By means of the handle 5 the device can be readily manipulated.

It will be seen that the apparatus is very simple and inexpensive in construction, light and durable, and provides a means for quickly and thoroughly drying the hair.

While I have shown what I consider to be the preferred embodiment of my invention, it will be seen that in its essence my device consists of a hollow comb adapted to receive a heating medium whereby the outer surfaces of the teeth and casing may be kept sufficiently heated to facilitate the drying of the hair through which the comb is passed. Consequently some of the advantages of my invention will be obtained by merely supplying the interior of the casing with hot water or other medium whereby the teeth will be kept sufficiently warm for a longer or shorter period, even though there be no circulation of the heating medium through the casing. In such cases, if need be, the heating medium may be renewed from time to time.

Broadly considered, it is not even essential that the heating medium shall enter the teeth of the device, as the drying heat may be supplied solely by the body of the casing. So, also, other heating means—such, for instance, as an electrical resistance-coil—may be used in place of a heated fluid.

Having thus fully described my invention, what I therefore claim as new, and desire to secure by Letters Patent, is—

1. In an apparatus of the character described, the combination with a casing provided with hollow teeth having closed outer ends; of means for supplying the interior of the teeth with a circulating heating medium.

2. In an apparatus of the character described, the combination with a casing provided with teeth having closed outer ends and extending therefrom; of means for supplying the interior of the casing with a circulating heating medium.

3. In an apparatus of the character described, the combination with the casing having hollow teeth integral therewith and an inlet and outlet at opposite ends of the casing; of means within the casing for directing liquid into the teeth successively in its passage from the inlet to the outlet.

4. In an apparatus of the character described, the combination with a casing having an inlet and an outlet at opposite ends thereof and hollow teeth extending from the casing; of partitions within the casing and projecting into the teeth said partitions being interposed between the inlet and the outlet.

5. In an apparatus of the character described, the combination with a casing having an inlet and an outlet and hollow teeth extending from the casing; of partitions within the casing, and between the inlet and the outlet, said partitions projecting into the teeth and forming passages therein and a handle extending from the casing.

6. In an apparatus of the character described, the combination with the casing having an inlet and an outlet and hollow teeth integral with and extending from the casing; of transversely-extending partitions within the casing and between the inlet and the outlet said partitions projecting into the teeth, and a handle upon the casing.

7. In an apparatus of the character described, the combination with a casing having an inlet-tube connected to one end thereof and an outlet-tube connected to the other end and hollow teeth integral with and extending from the casing; of transversely-extending partitions within the casing and projecting into the teeth, said partitions being located between the inlet and the outlet, and a handle connected to the casing.

In testimony whereof I affix my signature in presence of two witnesses.

JOHN JOSEPH NUTT.

Witnesses:
 ARTHUR MARION,
 CHAS. C. GILL.